July 17, 1962     B. R. ADELMAN     3,044,254
ROCKET MOTOR
Filed March 14, 1955
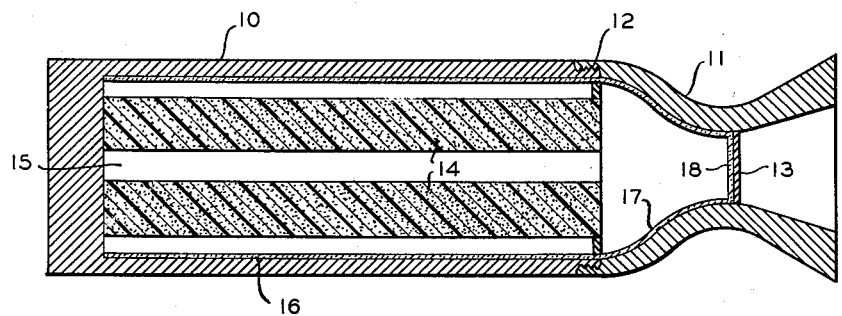
INVENTOR.
B. R. ADELMAN
BY *Hudson and Young*
ATTORNEYS

United States Patent Office 3,044,254
Patented July 17, 1962

3,044,254
ROCKET MOTOR
Barnet R. Adelman, Waco, Tex., assignor to Phillips Petroleum Company, a corporation of Delaware
Filed Mar. 14, 1955, Ser. No. 494,057
8 Claims. (Cl. 60—35.6)

This invention relates to an improvement in rocket motors utilizing solid propellants. In one of its more specific aspects it relates to a method for insulating the inner walls of a rocket motor with a material which also acts as a desiccant.

Recently it has been discovered that superior solid propellant mixtures are obtained comprising a major proportion of a solid oxidant such as ammonium nitrate or ammonium perchlorate and a minor proportion of a rubbery binder material such as a copolymer of butadiene and a vinylpyridine or other substituted heterocyclic base compound, which after incorporation is cured by a quaternization reaction or a vulcanization reaction. Solid propellant mixtures of this nature and a process for their production are disclosed and claimed in copending application Serial No. 284,447 filed April 25, 1952, by W. B. Reynolds and J. E. Pritchard, now Patent No. 3,003,861.

Solid propellant mixtures manufactured according to the above process are employed in rocket motors in the form of individual grains, clusters of individual grains or in some cases, are case bonded to the rocket motor so as to substantially fill the rocket motor shell. These propellants usually contain from 80 to 90 weight percent ammonium nitrate, which is hygroscopic and thus the propellant charge must be maintained in a dry atmosphere until ready for use. The propellant grains are usually placed in the rocket motor and hermetically sealed until ready for use. One method for sealing the propellant before use within the rocket motor is by means of a bursting diaphragm in the exhaust nozzle of the rocket which serves the dual purpose of keeping moisture out and maintaining a predetermined minimum pressure in the rocket motor during the starting procedure because the propellant operates more satisfactorily at elevated pressure.

Although precautions are taken to maintain the propellant in dry condition from the time it is manufactured until it is ready for firing, there always exists the possibility that moisture may enter the rocket motor casing and wet the propellant charge to the point where the burning of the propellant will be materially decreased or even possibly prevented. Rockets used in certain installations, for example, JATO units, must be positive with respect to firing and must burn at substantially the designed rate in order to provide safe take-off operations for the aircraft employing them.

It is an object of this invention to provide an insulating desiccant for use with rocket motors.

It is another object of this invention to provide a method for insuring the prevention of moisture from entering the propellant of a rocket motor.

It is still another object of this invention to provide a method for determining whether a rocket propellant has absorbed a dangerous amount of moisture.

Other and further objects and advantages will be apparent to one skilled in the art upon study of the disclosure of the present invention.

The drawing is a longitudinal section of a rocket motor presented in simplified form.

Broadly speaking, the invention provides a desiccant for a rocket motor which upon firing of the rocket provides insulation for the inner walls of the rocket motor. I have devised a liner for the interior of the rocket motor combustion chamber which acts as a desiccant and preferentially absorbs moisture entering the rocket motor casing and thus maintains the propellant charge substantially moisture-free. The rocket motor liner comprises a substantially neutral desiccating material which becomes fused to the combustion chamber walls and provides insulation from the high temperatures developed in the combustion chamber. A preferred lining contains a major portion of a strong desiccating material, for example, silica gel, anhydrous calcium carbonate, or other suitable desiccant combined with a rubbery binder material such as that used in the propellant formulation. This composition is preferably made into sheet form and applied to that part of the rocket motor which requires insulation. This material acts as a desiccant prior to firing of the rocket, and upon firing the desiccant becomes fused to the motor wall and acts as insulation for the motor wall.

A feature of the invention lies in using an indicating desiccant, such as a desiccating agent, having incorporated therewith a material such as cobaltous chloride, applied to the inner side of the nozzle burst diaphragm. An indicating desiccant of this type is blue when dry and pink when wet so that periodic inspection of rocket motors in storage would reveal whether or not the propellant grain is in a satisfactory condition.

Satisfactory desiccating materials include anhydrous calcium carbonate, silica gel, alumina, anhydrous magnesium sulfate, anhydrous calcium sulfate, Dicalite (an expanded diatomaceous earth) etc. It is often advantageous to combine phosphorus pentoxide with the above named desiccants. Compounds which are strongly basic, such as calcium oxide, or strongly acid, should be avoided because such materials have a deleterious effect upon the rubbery binder material. Thus the desiccant should be substantially neutral.

Cobaltous chloride is the preferred indicator for use with the desiccants however any of the cobaltous halides and other known indicating materials can be employed if desired.

The rubbery material employed as the binder in our insulating desiccator preferably comprises the copolymers which are used to bind the materials of the solid propellant and usually comprise a conjugated diene containing from 4 to 8 carbon atoms per molecule such as butadiene, isoprene, piperylene, methyl pentadiene, chloroprene, and the like, copolymerized with a polymerizable heterocyclic nitrogen base such as the vinyl-substituted pyridines, vinyl-substituted quinolines and various alkyl-substituted derivatives of these compounds such as 2-methyl-5-vinylpyridine, 2-vinylpyridine, 2-vinylquinoline and the like. The copolymers can be prepared by any suitable method, e.g., emulsion polymerization. It is often desirable to incorporate carbon black in the copolymer during its preparation. The addition of carbon black is accomplished by conventional methods, such as adding the carbon black to the latex to coagulate so as to form a masterbatch, and the amount of carbon black can be from 0 to 35 parts of black per 100 parts of copolymer. In the preparation of the copolymer, the amount of conjugated diene will be at least 50 parts by weight per 100 parts of the monomer mixture and the heterocyclic nitrogen base component will be in the range of 5 to 50 parts. While the invention is described herein with particular respect to polymers in which a heterocyclic nitrogen base is included, other rubbery polymers, such as a butadiene-styrene copolymer, are also applicable.

Compounding agents are incorporated into the copolymer in producing the rubber binder compositions prepared according to the process of this invention. Compounding agents include vulcanization agents, quaternization agents, vulcanization accelerators, softeners, stabilizers such as antioxidants, surface active agents, etc.

The desiccating, insulating liner can be bonded to the combustion chamber walls by other methods, and some desiccants can be applied without a binder, for example silica gel can be precipitated directly onto the combustion chamber walls. Glue and high melting point microcrystalline waxes can be employed as bonding agents.

A particularly preferred bonding agent is prepared from butadiene-methylvinylpyridine copolymer as hereinbefore described combined with an alkyd resin prepared by esterifying a mono or polycarboxylic acid with a polyhydric alcohol. Suitable plasticizers and curing agents are incorporated into the composition which is dissolved in a suitable solvent, such as benzene. This bonding agent is described and claimed in copending application Serial No. 506,658, filed May 6, 1955, by R. L. Hall and D. R. Smith, now Patent No. 2,898,315.

As an illustration of the invention, reference is made to the drawing wherein a rocket motor casing section 10 and an exhaust nozzle section 11 are secured together by a threaded connection 12. Frangible bursting diaphragm 13 is secured in the nozzle section so as to hermetically seal the rocket motor and to provide a predetermined pressure within the combustion chamber 15 upon ignition of the propellant charge 14. Conventional ignition means are employed but are not shown so as to provide simplicity of illustration. The propellant charge 14 is the internal, external burning type so that the combustion chamber walls are subjected to combustion temperatures throughout the combustion period of the rocket motor. The inner walls of the casing section 10 are covered with a layer 16 of the insulating desiccant of this invention. The inner walls of the detachable nozzle 11 are also covered with a layer 17 of this material. The frangible diaphragm 13 is covered on its inner surface with a layer 18 of the indicating, insulating desiccant of this invention.

The following example is illustrative of a typical insulating desiccant composition used as a liner material in a rocket motor according to the practice of this invention. The example is intended to illustrate the invention but should not be construed so as to limit the invention.

EXAMPLE I

A binder composition containing the ingredients as set forth in Table I, is prepared according to the procedure set forth in Table I.

Table I

| Components: | Parts by weight |
|---|---|
| Copolymer black masterbatch[1] | 110 |
| Benzophenone | 8 |
| Pentaryl A (amylbiphenyl) | 8 |
| Sulfur | 1.75 |
| Zinc oxide | 3 |
| Aerosol OT (dioctyl ester of sodium sulfosuccinic acid) | 1 |
| Flexamine (a physical mixture containing 65% of a complex diarylamineketone reaction product and 35% N,N'-diphenyl-p-phenylenediamine) | 3 |

[1] Copolymer prepared by emulsion polymerization of a monomer mixture comprising 90 parts by weight butadiene and 10 parts by weight 2-methyl-5-vinylpyridine. Copolymer masterbatched with 10 parts by weight medium abrasion furnace black per 100 parts by weight copolymer.

The copolymer-black masterbatch is kneaded for about 5 minutes or until the black is uniformly dispersed in the copolymer. The sulfur, zinc oxide, Aerosol OT and Flexamine are then added and mixed for about 3 minutes after which the benzophenone and Pentaryl A are added and the entire batch is then mixed for approximately 50 minutes.

Approximately 85 parts by weight of anhydrous magnesium sulfate is mixed with approximately 15 parts by weight of the above binder material for about 50 minutes so that the materials were intimately mixed. This composition is then rolled into sheet form and applied to the inner surface of a rocket motor.

The uncured rubbery binder of the desiccant insulation causes the sheet to adhere tightly to the inner surface of the rocket motor. If desired, the sheet can be cured and then bonded to the rocket motor walls with uncured binder material.

EXAMPLE II

Magnesium sulfate is wetted with a 10 weight percent solution of cobaltous chloride and then dried so as to produce anhydrous magnesium sulfate containing a small amount of cobaltous chloride indicator. This material is then mixed with binder composition of Table I according to the method of Example I, rolled into sheet form and applied to the inner surface of a rocket motor bursting diaphragm.

Variations and modifications are possible within the scope of the disclosure of the present invention, the essence of which is a novel combined desiccant and insulating material and a method of preparing the material and utilizing it as a lining material for a rocket motor, and a rocket motor having an inner liner of a desiccating and insulating material.

That which is claimed is:

1. In a rocket motor comprising a combustion chamber; and an exhaust nozzle; the improvement comprising a liner consisting essentially of a substantially neutral solid desiccant covering the inner surfaces of said combustion chamber and nozzle.

2. The liner of claim 1 wherein the desiccant consists of silica gel which is precipitated directly onto the inner surfaces of the combustion chamber and nozzle.

3. A rocket motor comprising a combustion chamber; an exhaust nozzle; and a liner material comprising about 85 to 90 parts by weight of a substantially neutral solid desiccant, and about 10 to 15 parts by weight of a rubbery binder material comprising a copolymer of a conjugated diene containing from 4 to 8 carbon atoms per molecule and a heterocyclic nitrogen base, covering the inner surfaces of said combustion chamber and said nozzle.

4. In a rocket motor comprising a combustion chamber; an exhaust nozzle adapted to be attached to said combustion chamber; a bursting diaphragm secured in and sealing said exhaust nozzle; and an internal, external burning propellant charge comprising a major proportion of ammonium nitrate and a minor proportion of a copolymer of butadiene and methyl vinylpyridine and compounding agents; the improvement comprising a liner secured to the inner walls of said combustion chamber and said exhaust nozzle comprised of about 85 to 90 parts by weight of a substantially neutral solid desiccant and about 10 to 15 parts by weight of a rubbery binder material comprising a copolymer of a conjugated diene containing from 4 to 8 carbon atoms per molecule and a heterocyclic nitrogen base.

5. In a rocket motor comprising a combustion chamber; an exhaust nozzle adapted so as to be attached to said combustion chamber; a bursting diaphragm secured in and sealing said exhaust nozzle; and an internal, external burning propellant charge comprising a major proportion of ammonium nitrate and a minor proportion of a copolymer of butadiene and methylvinylpyridine and compounding agents; the improvement comprising a liner secured to the inner walls of said combustion chamber and said exhaust nozzle comprised of about 85 to 90 parts by weight of a substantially neutral solid desiccant and about 10 to 15 parts by weight of a rubbery binder material comprising a copolymer of a conjugated diene containing from 4 to 8 carbon atoms per molecule and a heterocyclic nitrogen base; and a liner secured to the inner surface of said bursting diaphragm comprising 85 to 90 parts by weight of a substantially neutral solid desiccant impregnated with a cobaltous halide and about 10 to 15 parts by weight of a rubbery binder material comprising a copolymer of a conjugated diene containing from 4 to 8 carbon atoms per molecule and a heterocyclic nitrogen base.

6. The rocket motor of claim 4 wherein the desiccant comprises anhydrous magnesium sulfate and the rubbery binder material comprises a copolymer of butadiene and methylvinyl pyridine.

7. The rocket motor of claim 4 wherein the desiccant comprises anhydrous magnesium sulfate containing a small amount of cobaltous chloride and the rubbery binder material comprises a copolymer of butadiene and 2-vinylpyridine.

8. The method of protecting the propellant charge in a rocket motor from moisture and protecting the walls of the combustion chamber of a rocket motor from the heat of combustion of the propellant which comprises intimately admixing about 85 to 90 parts by weight of a substantially neutral solid desiccant and about 10 to 15 parts by weight of a rubbery binder material comprising a copolymer of a conjugated diene containing from 4 to 8 carbon atoms per molecule and a heterocyclic nitrogen base; forming a resulting material into sheet form; covering the inner surface of the combustion chamber of the rocket motor with said sheets of material; positioning a solid propellant charge in the rocket motor; and sealing the combustion chamber of the rocket motor.

References Cited in the file of this patent

UNITED STATES PATENTS

| | | |
|---|---|---|
| 1,611,353 | Lepinte | Dec. 21, 1926 |
| 2,214,354 | Snelling | Sept. 10, 1940 |
| 2,341,310 | Calhoun et al. | Feb. 8, 1944 |
| 2,388,390 | Cooke et al. | Nov. 6, 1945 |
| 2,428,252 | Stroh | Sept. 30, 1947 |
| 2,479,470 | Carr | Aug. 16, 1949 |
| 2,503,269 | Hickman | Apr. 11, 1950 |
| 2,503,270 | Hickman | Apr. 11, 1950 |
| 2,563,265 | Parsons | Aug. 7, 1951 |
| 2,570,632 | Barton | Oct. 9, 1951 |
| 2,622,277 | Bonell | Dec. 23, 1952 |
| 2,643,611 | Ball | June 30, 1953 |
| 2,683,667 | Utter | July 13, 1954 |
| 2,713,768 | Livingston | July 26, 1955 |
| 2,939,275 | Loedding | June 7, 1960 |

FOREIGN PATENTS

| | | |
|---|---|---|
| 393,094 | Great Britain | June 1, 1933 |
| 500,963 | Great Britain | Feb. 17, 1939 |